United States Patent
Weglehner-Pilgerstorfer et al.

(10) Patent No.: US 12,394,873 B2
(45) Date of Patent: Aug. 19, 2025

(54) DEVICE FOR BREAKING THE ELECTRICAL CONNECTION TO A BATTERY CELL IN THE EVENT OF OUTGASSING

(71) Applicant: John Deere Electric Powertrain LLC, Moline, IL (US)

(72) Inventors: Ignaz Weglehner-Pilgerstorfer, Rainbach im Mühlkreis (AT); Philipp Kreisel, Freistadt (AT); Helmut Kastler, Freistadt (AT); Lukas Haider, Langschlag (AT); Manuel Riegler, Freistadt (AT); Christian Leitner, Rainbach im Mühlkreis (AT); Peter Dobusch, Grünbach (AT); Gerhard Waldschütz, Freistadt (AT)

( * ) Notice: Subject to any disclaimer, the term of this patent is extended or adjusted under 35 U.S.C. 154(b) by 536 days.

(21) Appl. No.: 17/783,408

(22) PCT Filed: Dec. 9, 2020

(86) PCT No.: PCT/AT2020/060442
§ 371 (c)(1),
(2) Date: Jun. 8, 2022

(87) PCT Pub. No.: WO2021/113891
PCT Pub. Date: Jun. 17, 2021

(65) Prior Publication Data
US 2023/0008601 A1    Jan. 12, 2023

(30) Foreign Application Priority Data
Dec. 13, 2019    (AT) .................... A 51091/2019

(51) Int. Cl.
*H01M 50/583*    (2021.01)
*H01M 50/30*    (2021.01)
(Continued)

(52) U.S. Cl.
CPC ......... *H01M 50/583* (2021.01); *H01M 50/30* (2021.01); *H01M 50/40* (2021.01);
(Continued)

(58) Field of Classification Search
CPC ...... H01M 50/30; H01M 50/40; H01M 50/58; H01M 50/583
See application file for complete search history.

(56) References Cited

U.S. PATENT DOCUMENTS 3,462,307 A * 8/1969 Voorhies ................ C08C 19/28
                                                                429/534
10,665,827 B2 5/2020 Li et al.
(Continued)

FOREIGN PATENT DOCUMENTS

EP    2608243 A1    6/2013
EP    3451410 A1    3/2019
(Continued)

OTHER PUBLICATIONS

English-language Abstract for JP 2014022273 A, Feb. 3, 2014.
English-language Abstract for JP2018037364 A, Mar. 8, 2018.

*Primary Examiner* — Kenneth J Douyette
(74) *Attorney, Agent, or Firm* — Tiajoloff & Kelly LLP

(57) ABSTRACT

A device for breaking the electrical connection to a battery cell (1) in the event of outgassing has the cell pole (3) on the outgassing valve side connected to an electrical contact point (5) at a connection point (4) via a connecting lead (2) which forms a fuse. The device, requiring few components and having a compact design, enables a reliable electrical and thermal protection of neighboring cells of an outgassing battery cell against overloading and prevents the spread of a thermal runaway. The device provides a spacer (6) between the connection point (4) and the contact point (5) that electrically isolates the connection point (4) from the contact
(Continued)

point (5) in the event of outgassing and that retains the cell pole (3).

19 Claims, 2 Drawing Sheets

(51) Int. Cl.
    *H01M 50/40*     (2021.01)
    *H01M 50/517*     (2021.01)
    *H01M 50/588*     (2021.01)
    *H01M 50/593*     (2021.01)

(52) U.S. Cl.
    CPC ....... *H01M 50/517* (2021.01); *H01M 50/588* (2021.01); *H01M 50/593* (2021.01); *H01M 2200/103* (2013.01)

(56) References Cited

U.S. PATENT DOCUMENTS

| 2009/0023061 | A1* | 1/2009 | Ogg ................. H01M 10/0413 |
| | | | 429/162 |
| 2009/0197180 | A1* | 8/2009 | Viavattine ........... H01M 50/463 |
| | | | 429/246 |
| 2013/0202941 | A1 | 8/2013 | Ono et al. |
| 2015/0280205 | A1 | 10/2015 | Lee et al. |
| 2018/0351152 | A1 | 12/2018 | Reingruber et al. |
| 2019/0067649 | A1 | 2/2019 | Li et al. |

FOREIGN PATENT DOCUMENTS

| EP | 3573127 A1 | 11/2019 |
| JP | 2014022273 A | 2/2014 |
| JP | 2018037364 A | 3/2018 |
| WO | 2017/088996 A1 | 8/2016 |

* cited by examiner

DEVICE FOR BREAKING THE ELECTRICAL CONNECTION TO A BATTERY CELL IN THE EVENT OF OUTGASSING

FIELD OF THE INVENTION

The invention relates to a device for disconnecting the electrical connection to a battery cell in the event of outgassing, wherein the cell pole on the outgassing valve side is connected to an electrical contact point at a connection point via a connecting conductor which forms a fuse.

DESCRIPTION OF THE PRIOR ART

Battery cell defects, which can be traced back to individual damaged cells, for example, are regularly accompanied by an uncontrolled escape of hot gas, which in turn can set in motion a self-enhancing, heat-producing chain reaction known as a "thermal runaway". In order to disconnect the affected battery cell electrically from a cell group in such a case on the one hand and to protect surrounding battery cells from the escaping hot gas on the other, contacting devices with two receiving bodies for battery cell end sections opposite one another with respect to a through-opening have already been proposed, wherein a connecting conductor is provided which passes through the through-opening and via which the cell pole of a battery cell on the outgassing valve side is connected to an electrical contact point. The conductor cross-section of the connecting conductor is selected so that it is melted by an overcurrent occurring in the event of a fault or by the escaping hot gas, thus severing the electrical connection. In order to protect neighboring battery cells from thermal damage, a ceramic flame protection plate can be inserted in the receptacle for the battery cell to be protected, so that the battery cell inserted into the receptacle is thermally insulated from the hot gas and, in the worst case, also protected from any flames that may develop. However, the disadvantage of such flame protection plates is that, due to their dimensions, they cannot withstand the pressure of the hot gas and can no longer fulfill their function.

In this context, it has also been shown that in the event of a cell defect and the associated increase in pressure inside the affected battery cell, not only does hot gas usually escape, but the electrode winding of the battery cell also detaches the outgassing valve-side pole cap due to the pressure and can escape from the battery cell through the through-hole of the contacting device. This then poses the risk of a short circuit between the then exposed electrode winding and the neighboring cell, which has already been electrically isolated by the fuse, so that the heat generated by the short circuit in turn leads to the spread of the thermal runaway to adjacent battery cells.

SUMMARY OF THE INVENTION

The invention is thus based on the object of creating a device of the type described at the beginning, which enables reliable electrical and thermal load protection of neighboring cells of a degassing battery cell and prevents the propagation of a thermal runaway while requiring few components and having a compact design.

The invention solves the object by providing a spacer between the connection point and the contact point which electrically insulates the connection point from the contact point in the event of outgassing and retains the cell pole. As a result of these features, in the event of outgassing, on the one hand the electrical connection of the defective battery cell to the contact point can be disconnected due to melting through of the connecting conductor and, on the other hand, the spacer prevents detachment of the outgassing valve-side pole cap from the battery cell, so that the electrode winding cannot escape from the latter but is retained in the defective battery cell. The spacer thereby forms a stop for the outgassing valve-side pole cap of the defective battery cell, in particular in the longitudinal direction of the cell, wherein an electrical connection to the contact point is avoided due to the electrical insulation effect of the spacer when the outgassing valve-side pole cap actually abuts against the spacer. Although the device according to the invention can in principle be equipped with known flame protection plates with regard to thermal load protection, particularly favorable design conditions result if the spacer itself forms the heat and flame protection.

To promote the discharge of hot gas while ensuring disconnection of the electrical connection, the spacer together with the connecting conductor can pass through an outgassing channel extending between the electrical contact point and the cell pole on the outgassing valve side. In this way, the connecting conductor is exposed to the outgassing hot gas, which allows the connecting conductor to melt through regardless of the electrical current intensity that occurs. Favorable conditions with regard to a compact design and reliable discharge of hot gas are obtained, for example, if the outgassing channel has a height of 2 to 10 mm, preferably 3 to 6 mm.

In the event of the connecting conductor melting through, spatial separation of the detached parts can be ensured and thus a continuing electrical connection avoided if the connecting conductor is materially connected to the degassing valve-side cell pole and the electrical contact point and if the connecting conductor extends from the contact point to the cell pole against a restoring force. For example, the connecting conductor may be welded or soldered to both the outgassing valve side cell pole and the contact point. With regard to the contact point, a materially bonded connection can also be understood to mean that, for example, the connecting conductor and the contact point are formed in one piece, i.e. are materially connected to each other.

Because battery cells, especially in connection with battery modules, are often subjected to cyclical electrical and thus also mechanical loads during normal operation, the tensile/compressive load play acting on the connecting conductors, especially in the joining direction, can lead to fatigue cracks in the connecting conductors in the long term. In order to reduce the mechanical stress on the connecting conductors without impairing the protective function of the spacer, it is proposed that the connecting conductor extends helically around the spacer. As a result of these measures, mechanical tolerance compensation can take place both in and against the joining direction, because the helical design allows a certain stretching or compression of the connecting conductor in and against the joining direction.

To enable simple assembly and a compact design, the spacer can be inserted from the contact point into the space spanned by the connecting conductor. In the event of a helical connecting conductor, the spacer thus extends along the main helix axis formed by the helical shape of the connecting conductor and thus passes through the envelope of the helix.

To ensure that the fuse is reliably triggered regardless of the quantity of hot gas escaping, it is recommended that the connecting conductor be designed as a double helix. As a result of these measures, the ratio of the free surface of the connecting conductor to its mass is increased, which further promotes melting as a result of hot gas escaping. If the two conductor tracks of the double helix open opposite each other in a common connection point for the cell pole of a battery cell on the outgassing valve side, the associated self-centering of the connection point can facilitate a welding process for the materially bonded and electrical connection of the connection point to the cell pole of the battery cell on the outgassing side.

In order to avoid inducing residual stresses due to cell respiration caused by changing operating parameters, which could damage the device or the battery cells themselves, despite a reliable spacer function of the device according to the invention, it is recommended that the spacer is spaced from the cell pole on the outgassing valve side during normal operation. The smallest distance between the spacer and the outgassing valve-side cell pole must be taken into account, so that the minimum distance is usually measured from the end face of the spacer facing the outgassing valve-side cell pole and closest to it. This minimum distance can, for example, be in the range from 0.1 to 5 mm, preferably from 0.5 to 2 mm, in order, on the one hand, to allow the hot gas to escape sufficiently and, on the other hand, to prevent the cell pole from moving away and thus a short circuit in the event of outgassing.

In order to use the spacer, despite its compact design, to also protect the region immediately adjacent to the contact point, in which, for example, an adjacent battery cell is located, from electrical and thermal stress and thereby simplify the assembly process, it is proposed that the spacer has a flame protection base and a retaining extension projecting from this flame protection base in the direction of the cell pole on the outgassing valve side. Accordingly, the spacer prevents hot gas from spreading with the aid of the flame protection base and, at the same time, ensures via the retention extension that there is sufficient free space between the outgassing valve and the flame protection base for discharging this hot gas. Thus, it is also possible to prevent a protruding cell pole cap or an escaping electrode winding from blocking the discharge of hot gas. For example, the spacer may be a shield body having a disk-shaped flame protection base and a cylindrical retaining extension. According to these features, the spacer may thus be formed as an integral component, which may preferably be of rotationally symmetrical design with respect to its longitudinal retaining extension axis. To enable simple manufacturing conditions, the spacer can be manufactured as an injection-molded component. In order to provide sufficient heat protection, a heat-resistant as well as flame-retardant plastic material can be used. In addition, an umbrella-like or mushroom-like design of the spacer can be used to form guide surfaces extending from the cylindrical retaining extension to the disk-shaped flame protection base, which further promote the discharge of the hot gas into the outgassing channel. In the event that the retaining extension is surrounded by the connecting conductor, such guiding surfaces also enable a targeted flow to the connecting conductor so that it melts reliably.

In this context, in order to improve the effect of the spacer as thermal protection while maintaining simple manufacturing conditions, it is advisable for the retaining extension to have an insulating chamber. For example, the retaining extension can form a cavity that acts as a thermal insulator and, in the event of outgassing, reduces the spread of heat acting on the spacer. Preferably, this cavity may be open towards the flame protection base.

In order to facilitate the connection with adjacent battery cells and to define the device according to the invention spatially with respect to the battery cells with clearance, it is proposed that the contact point forms a cell receptacle for a battery cell connecting against a joining direction, wherein the cell receptacle is inserted with the connecting conductor into a base body and is stop-limited against the joining direction. The cell receptacle can be bounded, for example, by a contact spring base, from which contact tongues protrude against the joining direction for engaging around the battery cell to be accommodated on the sheath side. However, the flame protection base of the spacer can also be provided between the contact spring base and the cell receptacle, as described above. According to particularly favorable embodiments, the contact spring can be formed in one piece together with the connecting conductor and the stop hooks. In this case, the contact spring can be formed, for example, as a deep-drawn part that has previously been stamped from a contact sheet. The stop hooks can, for example, be designed in such a way that they engage behind or under any undercuts in the base body.

To prevent damage to the connection point in this context, it is recommended that the base body forms latching arms for peripheral engagement in a groove of the adjacent battery cell. This restricts the freedom of movement of the battery cell, which is connected to the contact point via the connecting conductor, in the joining direction, thus preventing mechanical damage or even breakage of the connecting conductor or the connection point. In addition, the assembly process is further improved because these measures enable centered positioning of the outgassing valve-side cell pole relative to the connecting conductor, thereby facilitating a welding process.

BRIEF DESCRIPTION OF THE DRAWINGS

In the drawing, the subject matter of the invention is shown by way of example, wherein.

BRIEF DESCRIPTION OF THE PREFERRED EMBODIMENTS

Figure 1:
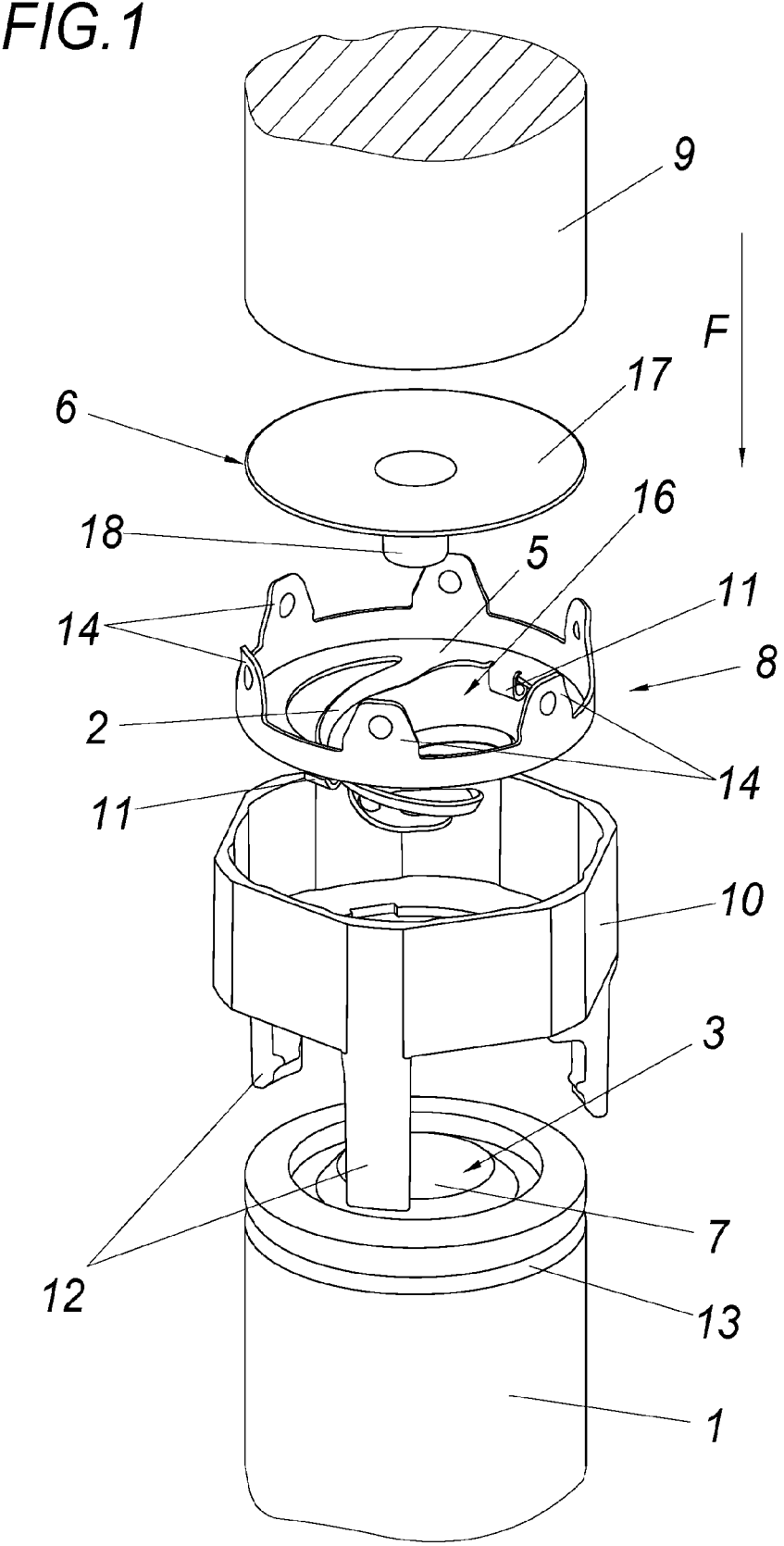
FIG. 1 shows an exploded view of a device according to the invention.

A device according to the invention for disconnecting the electrical connection to a battery cell 1 in the event of outgassing has a connecting conductor 2 which forms a fuse and connects the outgassing valve-side cell pole 3 of the battery cell 1 at a connection point 4 to an electrical contact point 5 in the form of a contact spring base. A spacer 6, which electrically insulates the connection point 4 from the contact point 5 in the event of outgassing and retains the cell pole 3, is provided between the connection point 4 and the contact point 5. In the event of outgassing, the device according to the invention thus enables, on the one hand, the electrical connection of the defective battery cell 1 to the contact point 5 to be disconnected due to the fusing of the connecting conductor 2 and, on the other hand, the spacer 6 prevents the pole cap 7 on the outgassing valve side from detaching from the battery cell 1, so that the electrode winding cannot escape from the latter but is retained in the defective battery cell 1.

Figure 2:
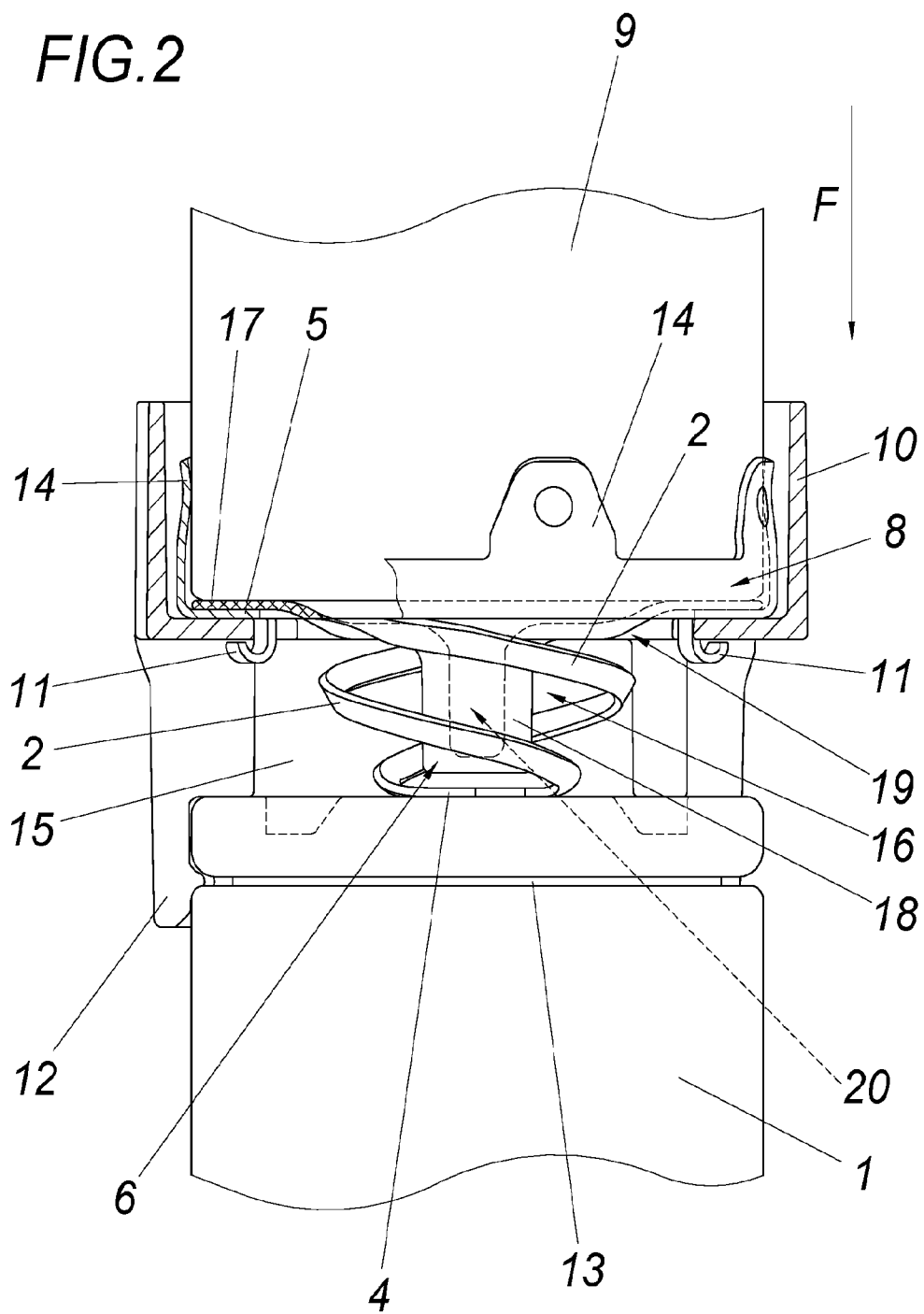
FIG. 2 shows a schematic sectional view of a device according to the invention in the installation position in normal operation.

As can be seen from the embodiment of a device according to the invention shown in FIG. 1 and FIG. 2, the contact point 5 can form a cell receptacle 8 for a battery cell 9 adjoining against a joining direction F, wherein the cell receptacle 8 is inserted with the connecting conductor 2 into a base body 10 and is stop-limited against the joining direction F via stop hooks 11. The base body 10 can also form latching arms 12 for peripheral engagement in a groove 13 of the adjacent battery cell 1. As shown in FIG. 1, contact tongues 14 can project from the contact point 5, which is formed as a contact spring base, against the joining direction F for engaging around the battery cell 9 to be accommodated on the casing side.

In particular, it can be seen from FIG. 2 that the spacer 6 together with the connecting conductor 2 can pass through an outgassing channel 15 for the hot gas to be discharged, which extends between the electrical contact point 5 and the cell pole 3 on the outgassing valve side. In the shown embodiment of the device according to the invention, the connecting conductor 2 extends as a double helix around the spacer 6, with the conductor tracks of the connecting conductor 2 opening together in the connection point 4. In this case, the spacer 6 is inserted from the contact point 5 into the intermediate space 16 spanned by the connecting conductor 2. The connection point 4 can preferably be connected to the cell pole 3 by a material bond, for example with the aid of a welding process.

The spacer 6 can have a disk-shaped flame protection base 17, preferably having the diameter of the battery cell, and a retaining extension 18 projecting from this flame protection base 17 in the direction of the cell pole 3 on the outgassing valve side. In this case, the spacer 6 can be inserted into the cell receptacle 8 in a simple manner and, for example, can be stop-limited in the joining direction F by the support edge of the contact point 5. In addition, to further promote the discharge of the hot gas into the outgassing channel 15, the spacer 6 can form guide surfaces 19 extending from the retaining extension 18 to the flame protection base 17. For improved thermal protection, the retention extension 18 may comprise an insulation chamber 20. For example, the spacer 6 may form a cavity that is open to the flame protection base 17. As can be seen, in particular, from FIG. 2, the flame protection base 17 may be provided between the contact point 5 and the cell receptacle 8 of the spacer 6. As can also be seen from FIG. 2, the spacer 6 can be spaced from the cell pole 3 in order, on the one hand, to allow sufficient escape of hot gas and, on the other hand, to prevent the cell pole 3 from escaping and thus a short circuit in the event of outgassing.

The invention claimed is:

1. A device for disconnecting an electrical connection to a battery cell in the event of outgassing, said device comprising:
   a connecting conductor electrically connecting a connection point electrically contacting a cell pole on an outgassing valve side of the battery cell to an electrical contact point;
   said connecting conductor forming a fuse; and
   a spacer supported between the connection point and the contact point;
   wherein the spacer provides structural support that blocks movement of the cell pole so that, in the event of outgassing, the spacer retains the cell pole and the connecting point, and electrically insulates the connection point from the contact point.

2. The device according to claim 1, wherein the connecting conductor extends helically around the spacer.

3. The device according to claim 2, wherein the connecting conductor is a double helix.

4. The device according to claim 1, wherein the spacer is inserted from the contact point into an intermediate space defined by the connecting conductor.

5. The device according to claim 1, wherein the spacer is spaced from the cell pole of the outgassing valve side during operation in which outgassing does not occur.

6. The device according to claim 1, wherein the spacer comprises a flame protection base and a retaining extension projecting from said flame protection base toward the cell pole of the outgassing valve side.

7. The device according to claim 6, wherein the retaining extension comprises an insulation chamber.

8. The device according to claim 1, wherein the contact point forms a cell receptacle for an adjacent battery cell connected in a joining direction, wherein the cell receptacle is inserted with the connecting conductor into a base body and is stop-limited against movement therein beyond a point in the joining direction.

9. The device according to claim 8, wherein the adjacent battery cell has a groove therein, and the base body forms latching arms circumferentially engaging in the groove of the adjacent battery cell.

10. The device according to claim 2, wherein the spacer is inserted from the contact point into an intermediate space defined by the connecting conductor.

11. The device according to claim 3, wherein the spacer is inserted from the contact point into an intermediate space defined by the connecting conductor.

12. The device according to claim 2, wherein the contact point forms a cell receptacle for an adjacent battery cell connected in a joining direction, wherein the cell receptacle is inserted with the connecting conductor into a base body and is stop-limited against movement therein beyond a point in the joining direction.

13. The device according to claim 12, wherein the adjacent battery cell has a groove therein, and the base body forms latching arms circumferentially engaging in the groove of the adjacent battery cell.

14. A device for disconnecting an electrical connection to a battery cell in the event of outgassing, said device comprising:
   a connecting conductor electrically connecting a connecting point electrically contacting a cell pole on an outgassing valve side of the battery cell to an electrical contact point;
   said connecting conductor forming a fuse; and
   a spacer supported between the connection point and the contact point;
   wherein the spacer retains the cell pole and electrically insulates the connection point from the contact point in the event of outgassing; and
   wherein an outgassing channel is defined between the electrical contact point and the cell pole of the outgassing valve side of the battery cell, and the spacer and the connecting conductor extend through the outgassing space.

15. The device according to claim 14 wherein the connecting conductor extends helically around the spacer.

16. The device according to claim 15 wherein the connecting conductor is a double helix.

17. The device according to claim 14, wherein the spacer is inserted from the contact point into an intermediate space defined by the connecting conductor.

18. The device according to claim 14, wherein the contact point forms a cell receptacle for an adjacent battery cell connected in a joining direction, wherein the cell receptacle is inserted with the connecting conductor into a base body and is stop-limited against movement therein beyond a point in the joining direction.

19. The device according to claim 18, wherein the adjacent battery cell has a groove therein, and the base body forms latching arms circumferentially engaging in the groove of the adjacent battery cell.

\* \* \* \* \*